(12) United States Patent
Chen et al.

(10) Patent No.: US 12,359,774 B2
(45) Date of Patent: Jul. 15, 2025

(54) FLEXIBLE CONNECTION DEVICE OF HYDROGEN HIGH- PRESSURE TYPE IV CYLINDER AND A CONTAINER FRAME

(71) Applicant: ZHEJIANG UNIVERSITY, Zhejiang (CN)

(72) Inventors: Zhiping Chen, Hangzhou (CN); You Li, Hangzhou (CN); Mengjie Liu, Hangzhou (CN); Zhi Cheng, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 87 days.

(21) Appl. No.: 18/363,677

(22) Filed: Aug. 1, 2023

(65) Prior Publication Data
US 2023/0375141 A1 Nov. 23, 2023

Related U.S. Application Data (63) Continuation of application No. PCT/CN2021/131345, filed on Nov. 18, 2021.

(51) Int. Cl.
*F17C 13/08* (2006.01)
*F17C 13/06* (2006.01)

(52) U.S. Cl.
CPC .............. *F17C 13/08* (2013.01); *F17C 13/06* (2013.01); *F17C 2201/0109* (2013.01); *F17C 2205/0107* (2013.01); *F17C 2205/0311* (2013.01)

(58) Field of Classification Search
CPC .............. F17C 13/08; F17C 2205/0107; F17C 2205/0305; B60K 15/07; B60K 2015/03453
See application file for complete search history.

(56) References Cited

U.S. PATENT DOCUMENTS

| 6,986,490 B2 * | 1/2006 | Eihusen | F17C 1/00 248/312 |
| 10,023,322 B2 * | 7/2018 | Keefer | B65D 39/084 |

(Continued)

FOREIGN PATENT DOCUMENTS

| CA | 2939035 A1 | 3/2017 |
| CN | 203975535 U | 12/2014 |

(Continued)

OTHER PUBLICATIONS

International Search Report (PCT/CN2021/131345); Date of Mailing: Feb. 24, 2022.

(Continued)

*Primary Examiner* — Nathan J Jenness
*Assistant Examiner* — Jennifer Castriotta
(74) *Attorney, Agent, or Firm* — Wiersch Law Group (57) ABSTRACT

A flexible connection device of a Type IV cylinder and a container frame, comprising a damping block, an anti-rotation block, a bushing, upper and lower clamping blocks (43, 44), and the like. The damping block cooperates with the anti-rotation block to flexibly control the circumferential rotation of the Type IV cylinder; and the bushing is combined with the upper and lower clamping blocks (43, 44) to limit the axial motion of the Type IV cylinder. For the feature that the interface of a boss and a plastic liner/composite overwrap is prone to premature failure, by allowing axial movement of one end of the Type IV cylinder in the container within a small range, a binding force borne by the cylinder during expansion/contraction is released, and the damping block is squeezed to consume energy.

5 Claims, 12 Drawing Sheets

(56) References Cited

U.S. PATENT DOCUMENTS

2019/0047404 A1    2/2019  Sawai
2022/0099250 A1*   3/2022  Song .......................... F17C 1/06
2022/0234439 A1*   7/2022  Petersen .......... B60K 15/03006

FOREIGN PATENT DOCUMENTS

| CN | 204341725    | 5/2015  |
|----|--------------|---------|
| CN | 108253288 A  | 7/2018  |
| CN | 108609313 A  | 10/2018 |
| CN | 109681577 A  | 4/2019  |
| CN | 110645317 A  | 1/2020  |
| CN | 111911804 A  | 11/2020 |
| CN | 112944207 A  | 6/2021  |
| GB | 2560945 A    | 10/2018 |
| JP | 04122900 U   | 11/1992 |
| KR | 20180088227 A| 8/2018  |

OTHER PUBLICATIONS

First Office Action(CN202110145974.9); Date of Mailing: Mar. 30, 2022.

* cited by examiner

FLEXIBLE CONNECTION DEVICE OF HYDROGEN HIGH-PRESSURE TYPE IV CYLINDER AND A CONTAINER FRAME

CROSS-REFERENCE TO RELATED APPLICATIONS

The present application is a continuation of International Application No. PCT/CN2021/131345, filed on Nov. 18, 2021, which claims priority to Chinese Application No. 202110145974.9, filed on Feb. 2, 2021, the contents of both of which are incorporated herein by reference in their entireties.

TECHNICAL FIELD

The present disclosure relates to the field of hydrogen high-pressure storage and transport equipment, in particular to a flexible connection device of a hydrogen high-pressure Type IV cylinder and a container frame.

BACKGROUND

A new type of hydrogen storage tube-bundle container assembled from large-volume Type IV cylinders is a cost-effective, reliable and promising solution for the unbalanced distribution of hydrogen energy, and it is the key technology to promote the development of hydrogen economy in China. Compared with the traditional Type I, II and III cylinders, the Type IV cylinder has the advantages of stronger hydrogen storage and transport capacity, lower ownership cost and longer service life.

At present, the Type IV cylinder is rigidly connected with the container frame, that is, the necks of boss at both ends of the cylinder are fixed on the mounting flange by means of threads+positioning pins/octagonal grooves, and the mounting flange is further fixed on the container frame support plate with bolts completely rigidly to prevent the cylinder from moving axially or rotating circumferentially. This rigid connection structure is designed for the Type I, II and III cylinders, without taking into account the characteristics that the interface of the boss (metal) and the composite overwrap/plastic liner (nonmetal) is not firm and easy to fail. The neck of the boss is completely fixed on the support plate of the container frame, so the interface of metal and non-metallic materials of the Type IV cylinder will directly bear all the deformation, force and movement of the composite cylinder under complex working conditions such as mass eccentricity, road transport, hydrogen charging and discharging, environmental temperature change, etc. This will easily lead to the stress concentration at the interface of boss and composite overwrap/plastic liner, and even lead to major accidents such as leakage, diffusion and explosion of high-pressure hydrogen, which will seriously reduce the safety of tube-bundle container assembled from large-volume Type IV cylinders.

It is worth noting that the plastic liner of the Type IV cylinder is soft, thus its bending deformation is large during the filament winding process, which leads to a serious mass eccentricity. Therefore, compared with the Type I, II and III cylinders, the Type IV cylinder has a greater tendency of circumferential rotation in transport conditions. However, its negative influence has not been taken into account in the design of hydrogen storage tube-bundle containers assembled from large-volume Type IV cylinders at home and abroad.

SUMMARY

In view of the above problems in the prior art, the present disclosure provides a flexible connection device of a Type IV cylinder and a container frame. According to the present disclosure, the axial movement of one end of the Type IV cylinder in a small range is allowed, so that the binding force of the cylinder during expansion/contraction is released, and meanwhile, the damping block is squeezed by the circumferential rotation of the cylinder to consume energy, so that the torque borne by the interface of the boss and the plastic liner/composite overwrap is reduced. According to the present disclosure, the stress distribution of the Type IV cylinder can be improved, which reduces the risk of damage and failure of the tube-bundle container. That is to say, the safety of the tube-bundle container assembled from large-volume Type IV cylinders can be improved.

The technical solution of the present disclosure is as follows:

A flexible connection device of a Type IV cylinder and a container frame, wherein the device includes a damping block, an anti-rotation block, a bushing, an upper clamping block and a lower clamping block; one end of the Type IV cylinder is set as a fixed end, which completely restricts the axial freedom, and the other end is set as a sliding end, which can slide axially within a certain range; the damping block is provided with a groove and a through hole; the anti-rotation block is arranged in the groove of the damping block and is circumferentially and rigidly connected with a cylinder boss; an inner surface of the bushing is provided with threads, which are connected with external threads of the cylinder boss and rigidly fix the anti-rotation block axially by a screwing force; a circular ring boss is provided outside the bushing to be matched with a circular ring clamping groove formed by the combination of the upper clamping block and the lower clamping block; the upper clamping block and the lower clamping block are mutually positioned by using a positioning pin column hole and a positioning pin column, which are fastened by a hoop long bolt assembly to hoop the bushing but not limit the circumferential rotation of the bushing; the damping block, the upper clamping block and the lower clamping block are all provided with fastening bolt holes at four corners to be fixed on the support plate by fastening bolt assemblies.

In an embodiment, two adjacent ring bosses are arranged outside a neck of the cylinder boss, the ring boss near a cylinder mouth is set to an octagonal boss while the ring boss near a cylinder shoulder is set to a circular boss, and a diameter of the circular boss is larger than a diameter of a circumscribed circle of the octagonal boss; the anti-rotation block is provided with an octagonal inner hole, and a size of the octagonal inner hole is the same as that of the octagonal boss at the neck of the boss; an outer edge of the anti-rotation block is arranged as an octagonal outer edge, and each side is provided with a square protrusion for enhancing the reliability of the connection between the anti-rotation block and the damping block.

In an embodiment, a shape of the groove of the damping block is consistent with a shape formed by combining the octagonal outer edge and the square protrusion of the anti-rotation block, and the two have the same size; a groove depth $t_1$ of the groove, a thickness $t_2$ of the anti-rotation block and a maximum axial deformation $\Delta L_{max}$ of the Type IV cylinder must satisfy $t_1-t_2>2\times\Delta L_{max}$; the anti-rotation block is placed in the groove with gaps left at the front and rear, and the widths of the two gaps at the front and rear is larger than $\Delta L_{max}$ to prevent the anti-rotation block from colliding with the damping block at the sliding end; a diameter of the through hole of the damping block needs to be larger than a diameter of the circular boss at the neck of the cylinder boss.

In an embodiment, the damping block is made of a damping composite material with high specific strength and high specific modulus, and its performance and structure can be designed as required, so the damping composite material can meet the structural rigidity requirements of the present disclosure and realize the reliable constraint of the circumferential rotation of the cylinder. According to the microscopic mechanism of damping principle, the damping composite material of a viscoelastic polymer matrix+a sheet reinforcement has strong internal friction characteristics. Under the external alternating stress, the deformation lags behind the stress change, so this damping composite can convert the external force into heat energy to be consumed. At the same time, under the external alternating stress, relative micro-slip will occur between the reinforcement and the matrix, which will further enhance the damping performance of the damping composite material. Under the road transport condition, the force of the circumferential rotation of the cylinder is random and variable. Therefore, the damping composite material can be used to consume the energy of the circumferential rotation of the cylinder, and reduce the torque of the joint part between the boss of the cylinder and the composite overwrap/plastic liner. In an embodiment, a circular ring boss is provided outside the bushing, and an entire outer surface of the bushing needs to be polished smoothly.

In an embodiment, the upper clamping block is provided with a semicircular clamping groove, and the surface of the clamping groove is polished smoothly; the left and right truncation surfaces of the clamping groove are provided with hoop long bolt holes, and positioning pin column holes are provided at the positions close to the hoop long bolt holes; the lower clamping block is provided with a semicircular clamping groove, and the surface of the clamping groove is polished smoothly; the left and right truncation surfaces of the clamping groove are provided with hoop long bolt holes, and positioning pin columns are provided at the positions close to the hoop long bolt holes; a width of the clamping groove of the upper clamping block is consistent with that of the clamping groove of the lower clamping block; a diameter of the positioning pin column hole is the same as that of the positioning pin column; after the upper clamping block and the lower clamping block are combined, a circular ring clamping groove is formed inside, and a diameter of the circular ring clamping groove is the same as that of the circular ring boss of the bushing.

As mentioned above, the contact surfaces of the bushing, the upper clamping block and the lower clamping block need to be polished smoothly, so as to reduce the maximum static friction force of the bushing rotating circumferentially, so that the anti-rotation block can squeeze the damping block to the maximum extent when the cylinder rotates circumferentially, and increase the energy consumed by the damping block.

In an embodiment, at the fixed end, the widths of the clamping groove of the upper clamping block and the clamping groove of the lower clamping block are consistent with the width of the circular ring boss of the bushing; at the sliding end, the widths of the clamping groove of the upper clamping block and the clamping groove of the lower clamping block are larger than the width of the circular ring boss of the bushing, and a difference therebetween is more than twice the maximum axial deformation (i.e., 2×ΔLmax) of the Type IV cylinder, so as to provide a space for the axial deformation of the Type IV cylinder.

In an embodiment, at the sliding end, the ring boss of the bushing is placed in the ring clamping groove formed by the combination of the upper clamping block and the lower clamping block, with gaps left at the front and rear, and the widths of the two gaps at the front and rear are larger than $\Delta L_{max}$; adjusting gaskets are arranged in both the two gaps.

In an embodiment, the adjusting gasket has a thickness less than $\Delta L_{max}$ and is layered in the thickness direction, with bonding between layers, and the materials of the layers are different in hardness, so as to be adapted to the axial deformation of the cylinder under different working conditions.

In an embodiment, the material, thickness and performance of each layer of the adjusting gasket can be selected and designed as required. On the one hand, it is used to provide buffer protection between the bushing of the sliding end and the upper and lower clamping blocks to prevent rigid collision; on the other hand, under the acceleration/deceleration condition of the transport vehicle, the adjusting gasket can provide a certain axial supporting force for the boss of the cylinder at the sliding end.

Compared with the prior art, the present disclosure has the following beneficial effects.

According to the present disclosure, the damping block is squeezed by the circumferential rotation of the cylinder body to consume energy, and the torque of the interface of the boss and the composite overwrap/plastic liner is effectively reduced while the circumferential rotation of the cylinder is controlled, so that the risk of damage and failure of hydrogen storage tube-bundle container assembled from large-volume Type IV cylinders is reduced.

By allowing the axial movement of one end of the Type IV cylinder in a small range, the present disclosure releases the binding force when the cylinder expands/contracts (especially, the hydrogen charging and discharging conditions of Type IV cylinder), improving the stress and deformation distribution of the cylinder as well as ensuring the safety and reliability of long-term operation of the tube-bundle container assembled from large-volume Type IV cylinders.

Meanings of each reference sign in the figures: 1. Container frame; 2. Type IV cylinder; 21. Boss; 22. Plastic liner; 23. Composite overwrap; 211. Octagonal boss; 212, Circular boss; 213. Internal thread of cylinder mouth; 214. External thread of cylinder mouth; 3. Support plate; 31. Fastening bolt hole; 32. Through hole; 4. Flexible connection device; 41. Damping block; 411. Fastening bolt hole; 412, Groove; 413. Through hole; 42. Hoop long bolt assembly; 421. Hoop long bolt; 422. Nut; 43. Upper clamping block; 431. Hoop long bolt hole; 432. Positioning pin column hole; 433. Clamping groove; 434. Fastening bolt hole; 44. Lower clamping block; 441. Hoop long bolt hole; 442. Positioning pin column; 443. Clamping groove; 444. Fastening bolt hole; 45. Bushing; 451. Boss; 452. Internal thread; 46. Fastening bolt assembly; 461. Fastening bolt; 462. Nut; 47. Anti-rotation block; 471. Octagonal inner hole; 472. Octagonal outer edge; 473. Square protrusion; 48. Adjusting gasket; 481. Gasket layer 1; 482. Bonding; 483. Gasket layer 2.

DESCRIPTION OF EXAMPLES

The present disclosure will be further described with reference to the following drawings and examples. It should be pointed out that the following examples are intended to facilitate the understanding of the present disclosure, but not to limit the present disclosure.

Example 1

Figure 1:
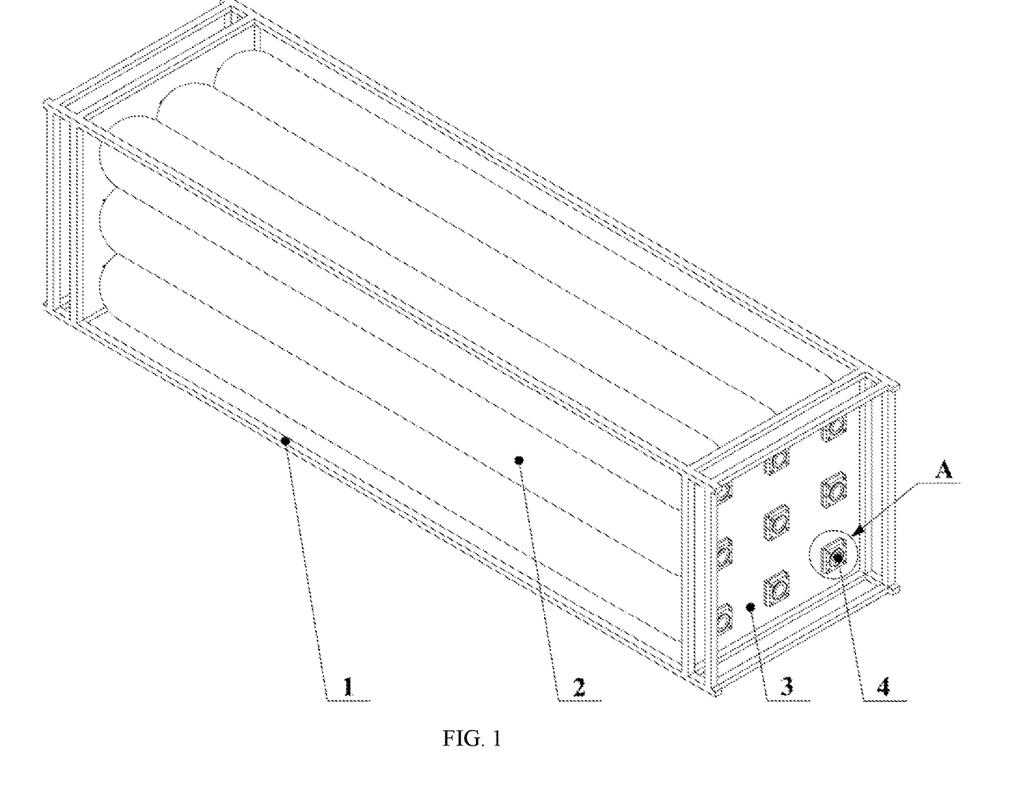
FIG. 1 is a schematic diagram of the overall structure according to Example 1.
Figure 2:
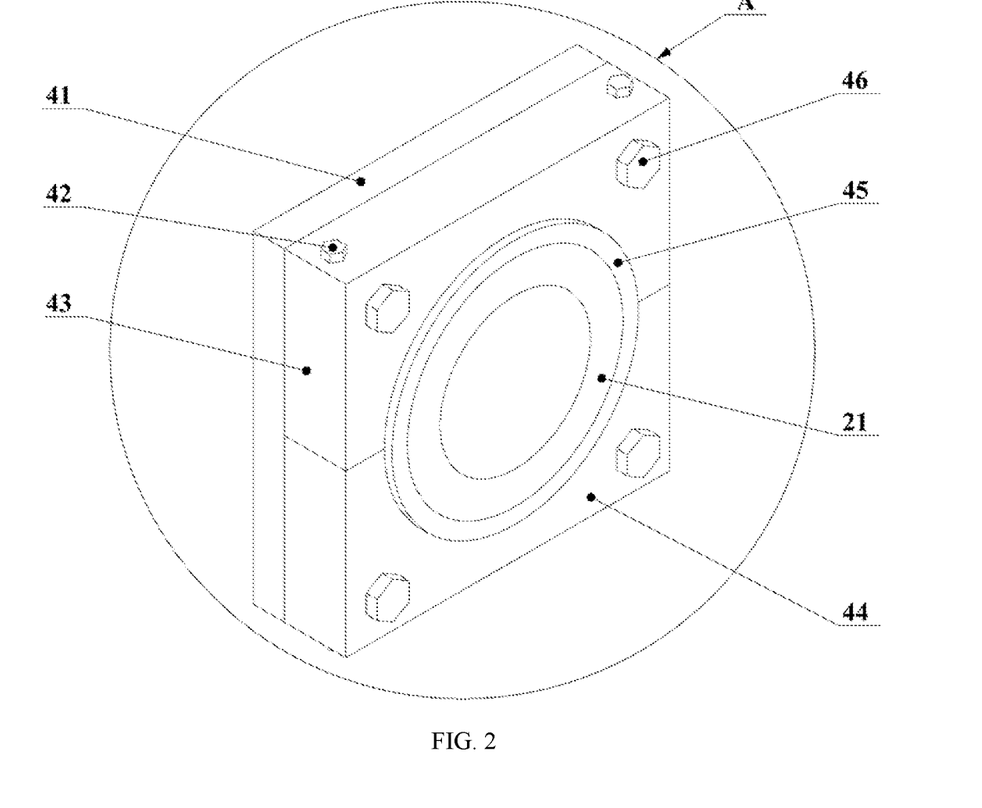
FIG. 2 is an enlarged view (flexible connection device) of FIG. 1 according to Example 1.

Example 1 shown in FIG. 1 is a container assembled from nine large-volume Type IV cylinders 2 lying horizontally, and the arrangement of 3×3 cylinders is adopted. The support plate 3 is fixedly connected with the container frame 1 by welding. On the basis of not changing the container frame structure and bundle arrangement, the present disclosure provides a flexible connection device for a Type IV cylinder and a container frame. As shown in FIGS. 2-17, the connection device is arranged between the cylinder mouth of the cylinder boss 21 and the support plate 3, and includes a damping block 41, an anti-rotation block 47, a bushing 45, an upper clamping block 43, a lower clamping block 44, adjusting gaskets 48, hoop long bolts 421, nuts 422 and hoop long bolt assembly 42.

Figure 3:
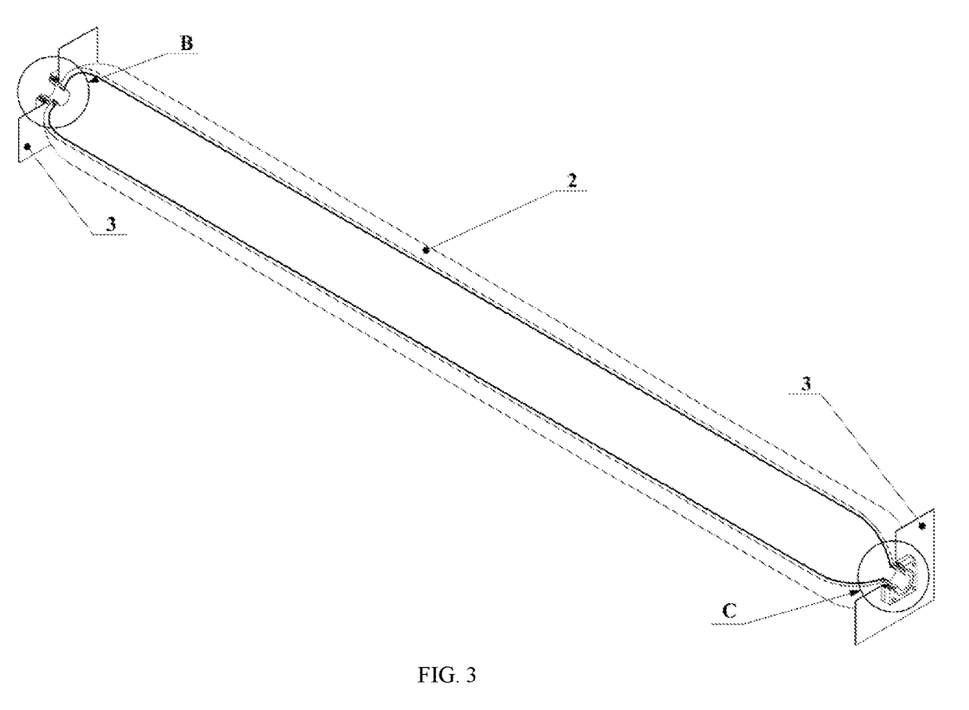
FIG. 3 is a sectional view of the connecting structure of a single cylinder according to Example 1.
Figure 4:
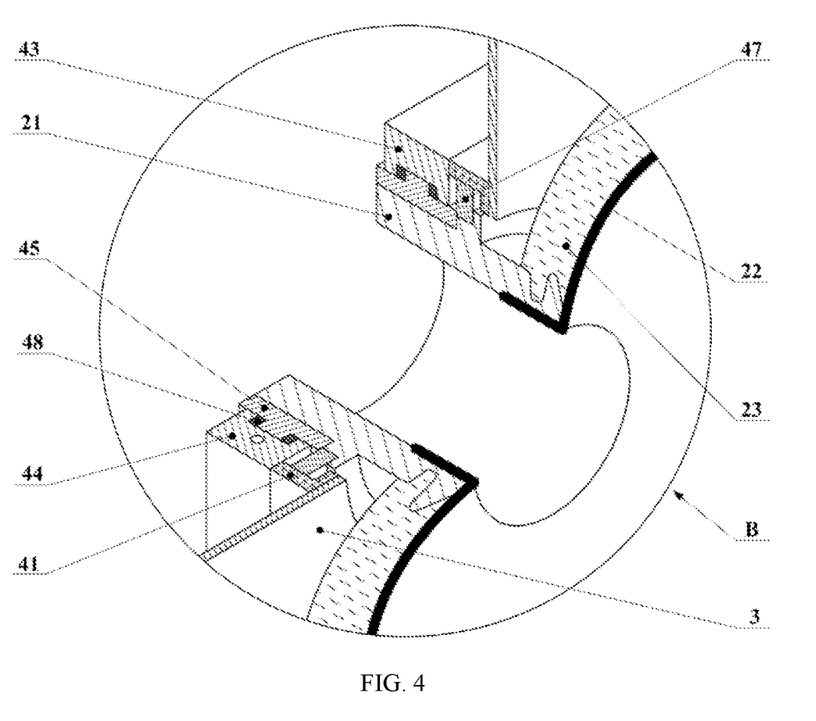
FIG. 4 is an enlarged view (the sliding end of a flexible connection device) of FIG. 3 according to Example 1.
Figure 5:
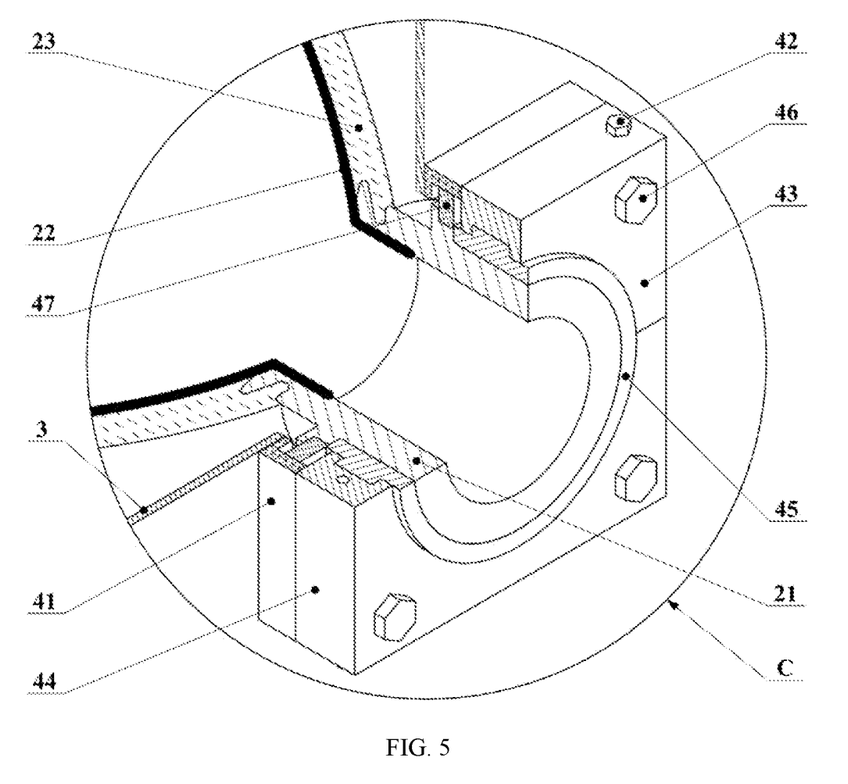
FIG. 5 is an enlarged view at C of FIG. 3 (the fixed end of the flexible connection device) according to Example 1.
Figure 6:
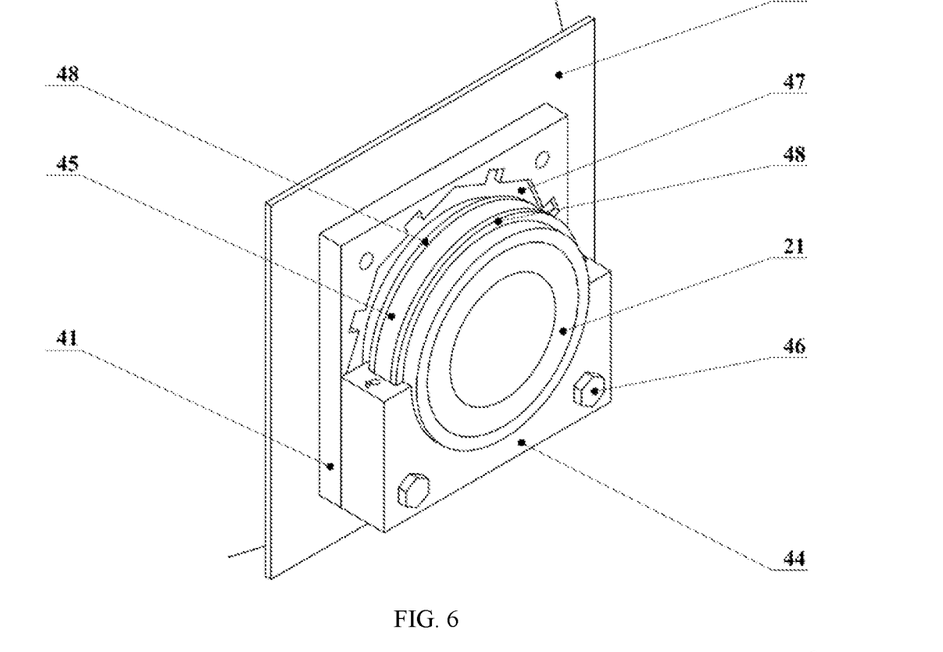
FIG. 6 is a schematic diagram of the internal structure of the sliding end of the flexible connection device according to Example 1.
Figure 7:
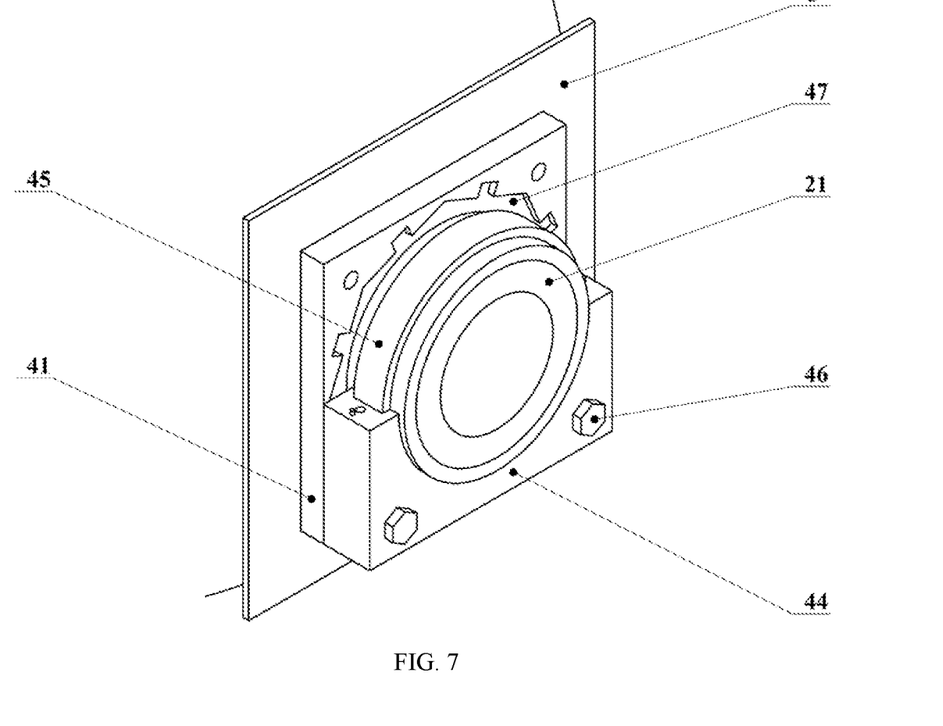
FIG. 7 is a schematic diagram of the internal structure of the fixed end of the flexible connection device according to Example 1.

As shown in FIG. 3, in this example, the flexible connection device at the left end of Type IV cylinder 2 is set as a sliding end, which can slide axially within a certain range, and the flexible connection device 4 at the right end is set as a fixed end, which completely restricts the axial freedom of this end of the cylinder 2. Through the combination of the fixed end and the sliding end, the following effects are achieved: the axial displacement of the cylinder 2 is restrained, and the binding force when the cylinder 2 expands/contracts is released.

As shown in FIGS. 4-7, the basic structure of the flexible connection device of the sliding end and the fixed end is the same. Specifically, the damping block 41 is provided with a groove 412 and a through hole 413; the anti-rotation block 47 is placed in the groove 412 of the damping block 41, and the anti-rotation block 47 is provided with an octagonal inner hole 471 for locking with the octagonal boss 211 of the cylinder boss 21, so as to realize the circumferential rigid connection between the anti-rotation block 47 and the cylinder 2; the inner surface of the bushing 45 is provided with threads, which are connected with the external threads 214 of the cylinder boss, and the anti-rotation block 47 is rigidly fixed axially by the screwing force; a circular ring boss 451 is provided outside the bushing 45 to be matched with the circular ring clamping groove formed by the combination of the upper and lower clamping blocks; the upper clamping block 43 and the lower clamping block 44 are mutually positioned by the positioning hole 432 and the positioning pin column 442, and they are fastened by the hoop long bolt assembly 42, so that the effect of hooping the bushing 45 but not restricting the circumferential rotation of the bushing 45 is achieved; the damping block 41, the upper clamping block 43 and the lower clamping block 44 are all provided with bolt holes at four corners to be fixed on the support plate 3 by fastening bolt assemblies 46.

Figure 11:
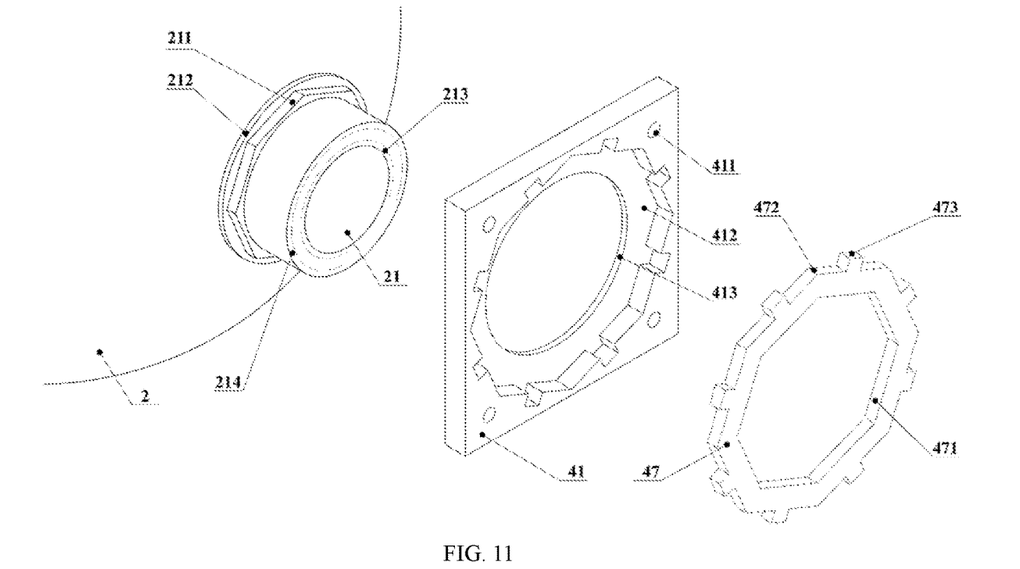
FIG. 11 is an exploded view of the anti-rotation structure of the flexible connection device according to Example 1.

Further, with reference to FIG. 11, the specific structures of the boss 21, the anti-rotation block 47 and the damping block 41 of the cylinder will be described. This part of the structure is used to flexibly restrain the circumferential rotation of the cylinder 2, and its working principle is: the damping material is squeezed by the circumferential rotation of the cylinder 2 to consume energy, thereby reducing the torque of the connection part between the boss 21 and the plastic liner 22 and the composite overwrap 23 (the composite material usually adopts carbon fiber reinforced polymer), and reducing the risk of damage and failure.

Two adjacent ring bosses are arranged outside the neck of the boss 21 of the Type IV cylinder 2. The ring boss near the cylinder mouth is an octagonal boss 211, and the ring boss near the cylinder shoulder is a circular boss 212, the diameter of the circular boss 212 being larger than the diameter of the circumscribed circle of the octagonal boss 211.

It is worth noting that the octagonal boss 211 and circular boss 212 should be located at a sufficient distance from the composite overwrap 23 on the boss 21, so as to avoid the damage of the composite overwrap 23 caused by the collision of the Type IV cylinder 2 with the support plate when it expands.

The rotation prevention block 47 is provided with an octagonal inner hole 471, and the size of the octagonal inner hole 471 is the same as that of the octagonal boss 211 at the neck of the boss 21. Meanwhile, the outer edge of the anti-rotation block is set as an octagonal outer edge 472, and each side is provided with a square protrusion 473, which is used to enhance the reliability of the connection between the anti-rotation block 47 and the damping block 41.

The shape of the groove 412 of the damping block 41 is consistent with the shape formed by combining the octagonal outer edge 472 and the square protrusion 473 of the anti-rotation block, and the two have the same size. The groove depth $t_1$ of the groove 412, the thickness $t_2$ of the anti-rotation block 47 and the maximum axial deformation $\Delta L_{max}$ of the Type IV cylinder 2 must meet the requirements of $t_1 - t_2 > 2 \times \Delta L_{max}$. Furthermore, the anti-rotation block 47 is placed in the groove 412, with gaps left at the front and rear, and the width of both the gaps at the front and rear is larger than $\Delta L_{max}$, so as to prevent the anti-rotation block 47 from colliding with the damping block 41 at the sliding end. In addition, the diameter of the through hole 413 of damping block 41 needs to be larger than the diameter of the circular boss 212 at the neck of the boss 21 of the cylinder, so as to avoid hindering the axial sliding of the sliding end of the cylinder 2 when expanding or contracting.

It is worth noting that the damping block is made of a damping composite material with high specific strength and high specific modulus, and its performance and structure can be designed as required, so it can meet the structural rigidity requirements of Example 1 and realize the reliable constraint of the circumferential rotation of the cylinder. According to the microscopic mechanism of damping principle, the damping composite material of a viscoelastic polymer matrix and a sheet reinforcement has strong internal friction characteristics. Under the external alternating stress, the deformation lags behind the stress change, so this damping composite material can convert the external force into heat energy to be consumed. At the same time, under the external alternating stress, relative micro-slip will occur between the reinforcement and the matrix, which will further enhance the damping performance of the damping composite material. Under the road transport condition, the force of the circumferential rotation of the cylinder 2 is random and variable. Therefore, the damping composite material can be used to consume the energy of the circumferential rotation of the cylinder 2, and reduce the torque of the joint part between the boss 21 of the cylinder and the composite overwrap 23/plastic liner 22, thus reducing the risk of damage and failure.

Further, the specific structures of the bushing 45, the upper clamping block 43, the lower clamping block 44 and the adjusting gasket 48 will be described with reference to FIGS. 8-10 and 12-14. This part of the structure is mainly used to support the cylinder 2 and flexibly restrain the axial rigid displacement of the cylinder 2. The working principle is: by allowing one end of the cylinder 2 to slide axially in a small range, the binding force of the cylinder 2 during expansion/contraction can be released (especially, the Type IV cylinder 2 has a large temperature change, slow heat dissipation and large thermal deformation under hydrogen charging and discharging conditions), and the stress and deformation distribution of the cylinder 2 can be improved, so as to improve the safety and reliability of the long-term operation of the tube-bundle container.

Figure 12:
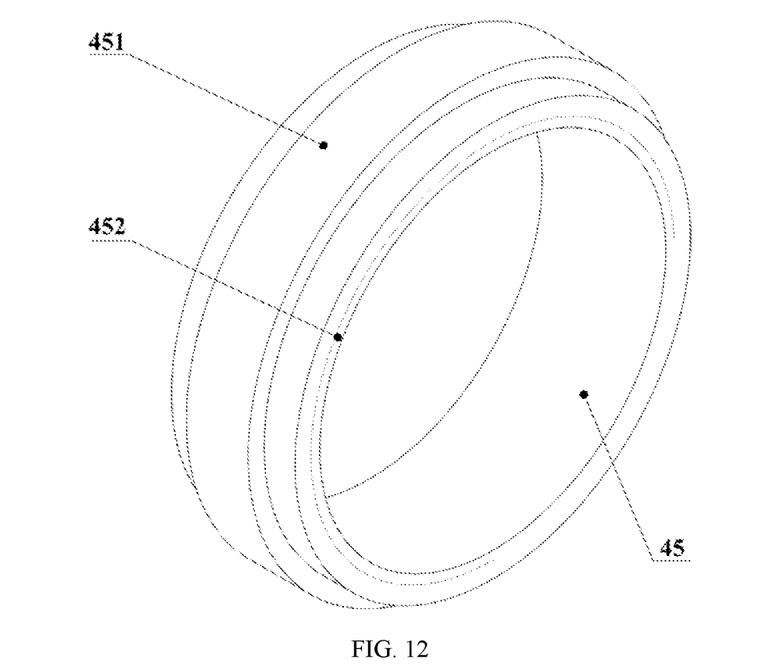
FIG. 12 is a schematic diagram of the bushing structure of the flexible connection device according to Example 1.

As shown in FIG. 12, a circular ring boss 451 is provided outside the bushing 45, and the entire outer surface of the bushing 45 needs to be polished smoothly.

Figure 8:
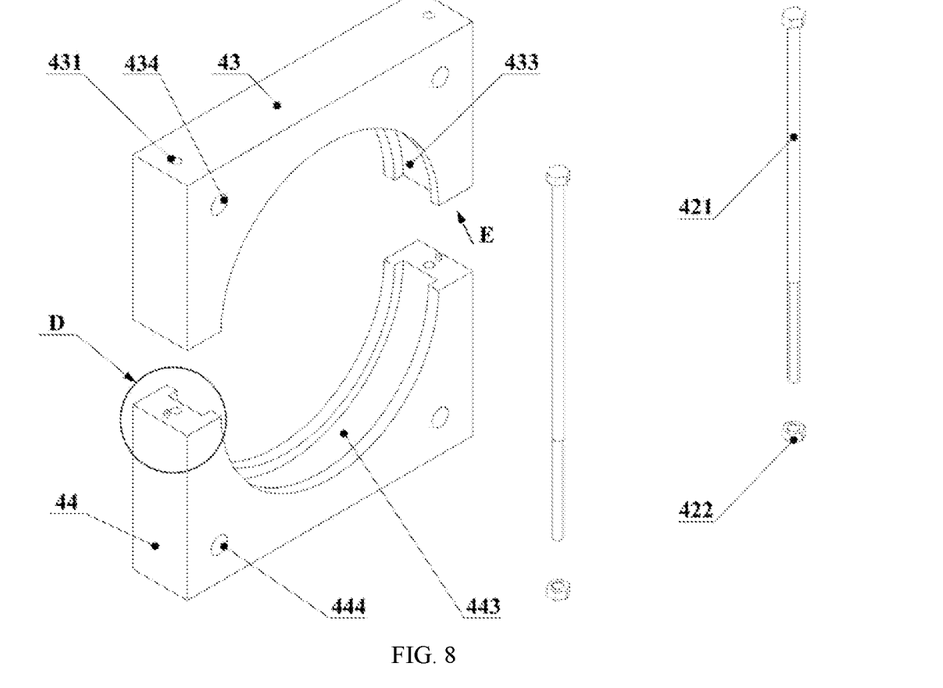
FIG. 8 is a schematic diagram of the structure and assembly mode of the upper and lower clamping blocks according to Example 1.
Figure 9:
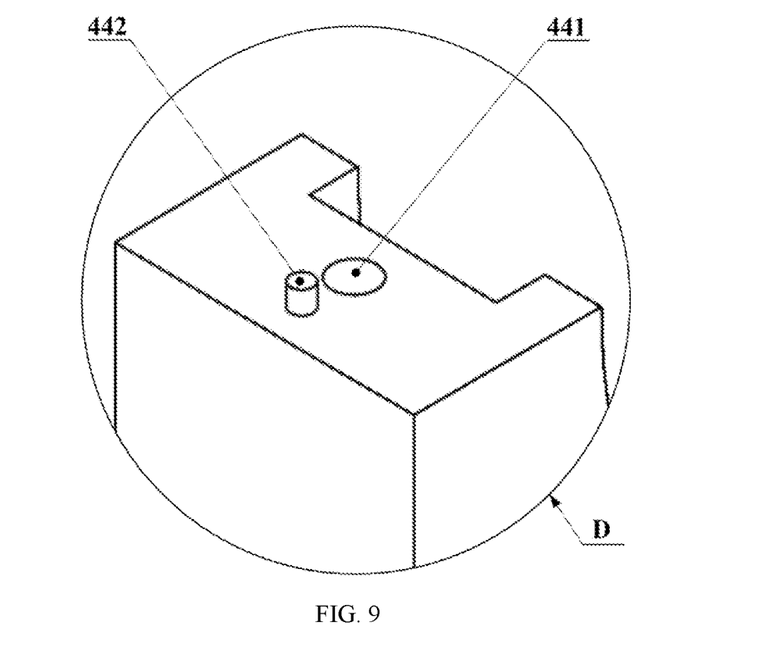
FIG. 9 is an enlarged view at D of FIG. 8 according to Example 1.
Figure 10:
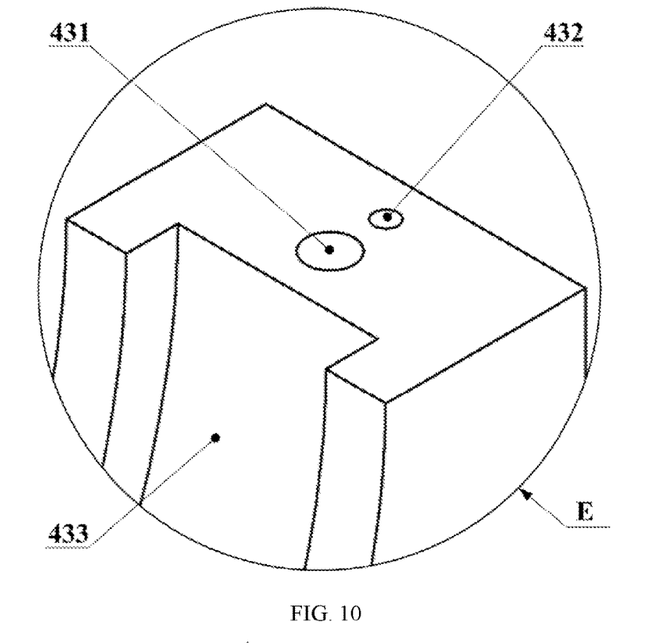
FIG. 10 is an enlarged view of E in FIG. 8 according to Example 1.

As shown in FIGS. 8-10, the structure and size of the upper clamping block 43 and the lower clamping block 44 are the same, with the only difference being that the upper clamping block 43 is provided with a positioning pin column hole 432, while the lower clamping block 44 is provided with a positioning pin column 442. Specifically, the upper clamping block 43 is provided with a semicircular clamping groove 433, and the surface of the clamping groove 433 is polished smoothly. The left and right truncation surfaces of the clamping groove 433 are provided with hoop long bolt holes 431, and hoop long bolt holes 431 are provided at positions near the positioning pin column holes 432. The lower clamping block 44 is provided with a semicircular clamping groove 443, and the surface of the clamping groove 443 is polished smoothly. The left and right truncation surfaces of the clamping groove 443 are provided with hoop long bolt holes 441, and positioning pin columns 442 are provided at positions near the hoop long bolt holes 441.

In addition, the width of the clamping groove 433 of the upper clamping block 43 is the same as that of the clamping groove 443 of the lower clamping block 44, and the diameter of the positioning pin column hole 432 is the same as that of the positioning pin column 442. After the upper clamping block 43 and the lower clamping block 44 are combined, a circular ring clamping groove is formed inside, and the diameter of the circular ring clamping groove is the same as that of the circular ring boss 451 of the bushing 45.

It is worth noting that the contact surfaces of the bushing 45, the upper clamping block 43 and the lower clamping block 44 need to be polished smoothly, so as to reduce the maximum static friction force of the bushing 45 when it rotates circumferentially, so that the anti-rotation block 47 can squeeze the damping block 41 to the maximum extent when the cylinder 2 rotates circumferentially, and increase the energy consumed by the damping block 41.

At the fixed end, the widths of the groove 433 of the upper clamping block 43 and the groove 443 of the lower clamping block 44 are consistent with the width of the ring boss 451 of the bushing; at the sliding end, the width of the groove 433 of the upper clamping block 43 and the groove 443 of the lower clamping block 44 are larger than the width of the ring boss 451 of the bushing, and the difference therebetween is more than twice the maximum axial deformation of the Type IV cylinder 2 (i.e. $2 \times \Delta L_{max}$), which is used to provide the space for the axial deformation of the Type IV cylinder 2.

Figure 13:
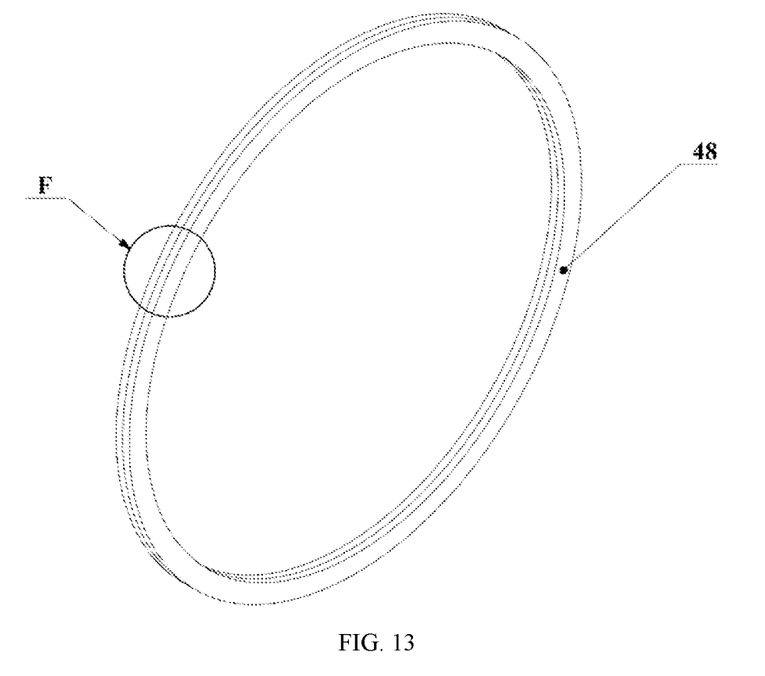
FIG. 13 is a schematic diagram of the structure of the adjusting gasket of the flexible connection device according to Example 1.
Figure 14:
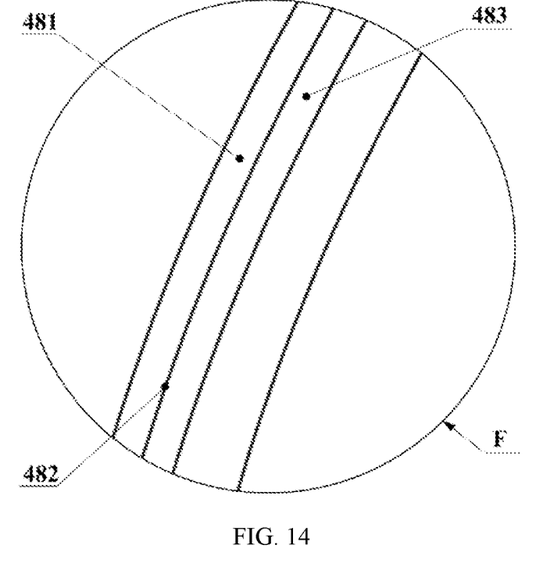
FIG. 14 is an enlarged view at F of FIG. 13 according to Example 1.
Figure 15:
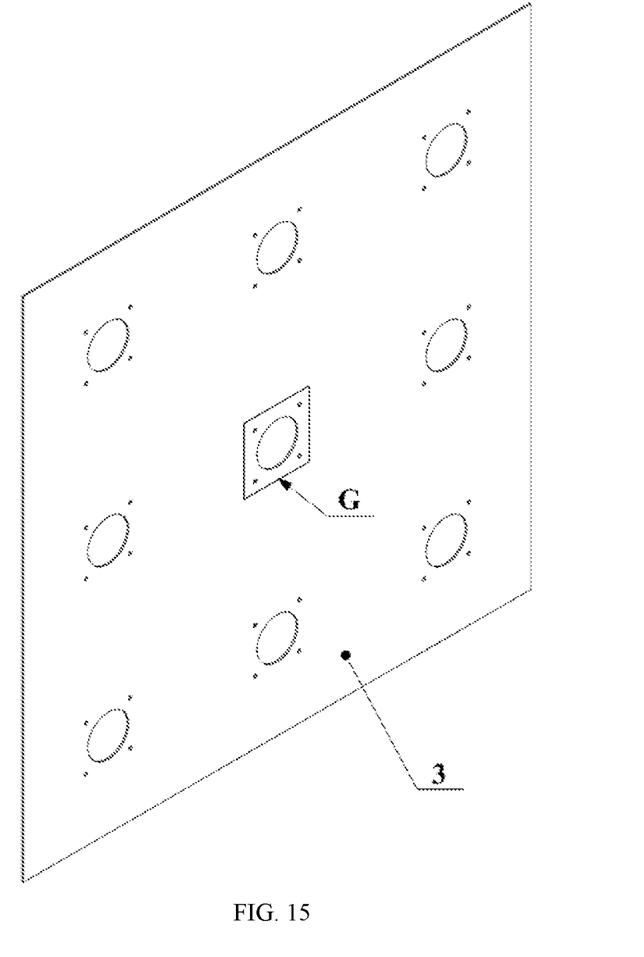
FIG. 15 is a structural schematic diagram of the support plate of Example 1.
Figure 16:
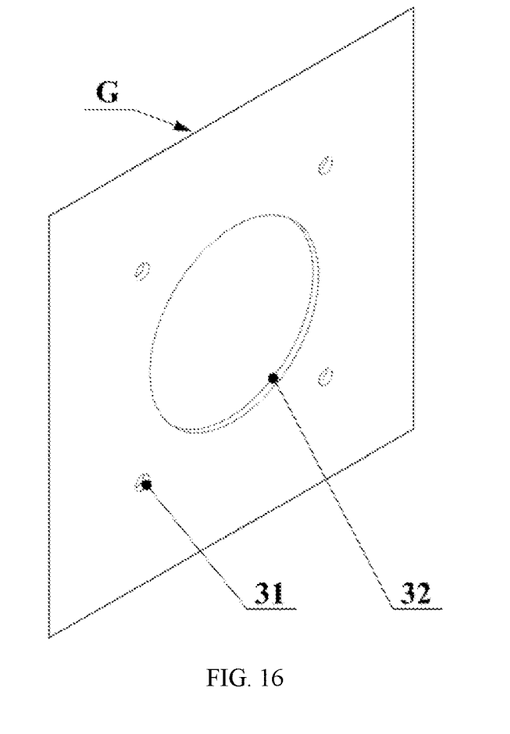
FIG. 16 is an enlarged view at G of FIG. 15 according to Example 1.
Figure 17:
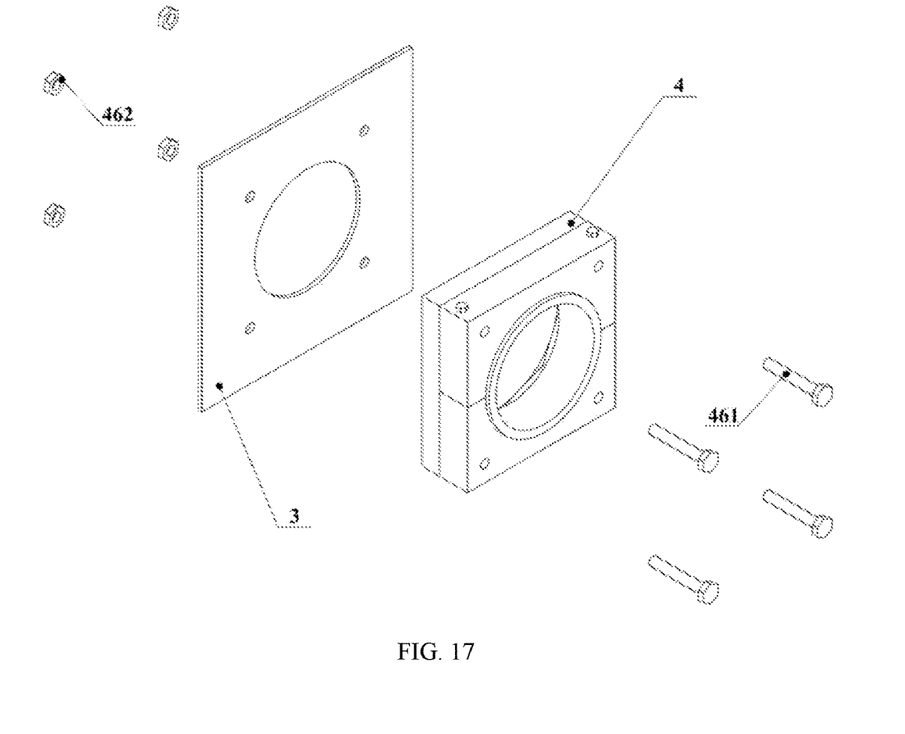
FIG. 17 is a schematic diagram of the installation mode of the flexible connection device and the support plate according to Example 1.

In addition, at the sliding end, the bushing ring boss 451 is placed in the ring clamping groove formed by the combination of the upper clamping block and the lower clamping block, leaving gaps at the front and rear, and the width of the two gaps at the front and rear gaps is larger than $\Delta L_{max}$. Furthermore, adjusting gaskets 48 are arranged in the two gaps, and the thickness of the adjusting gaskets 48 is less than $\Delta L_{max}$. The adjusting gaskets 48 are layered in the thickness direction, with bonding between layers, and the materials of various layers are different in hardness, so as to adapt to the axial deformation of the cylinder 2 under different working conditions.

In an embodiment, the material, thickness and performance of each layer of the adjusting gasket 48 can be selected and designed as required. On the one hand, it is used to provide buffer protection between the bushing 45 of the sliding end and the upper clamping block 43 and the lower clamping block 44 to prevent rigid collision; on the other hand, under the acceleration/deceleration condition of the transport vehicle, the adjusting gasket 48 can provide a certain axial supporting force for the boss 21 of the cylinder at the sliding end.

The basic principles, main features and beneficial effects of the present disclosure have been described in detail. It should be understood that the above are only specific examples of the present disclosure, and are not intended to limit the present disclosure. Any modifications, supplements and equivalent substitutions that made without departing from the scope of the principles of the present disclosure should be included in the scope of protection of the present disclosure.

What is claimed is:

1. A flexible connection device of a Type IV cylinder and a container frame for connecting a Type IV cylinder to a container frame support plate, wherein the flexible connection device comprises a damping block, an anti-rotation block, a bushing, an upper clamping block and a lower clamping block; one end of the Type IV cylinder is configured as a fixed end to completely restrict an axial freedom, and another end is configured as a sliding end and is capable of sliding axially within a certain range; the damping block is provided with a groove and a through hole; the anti-rotation block is arranged in the groove and is circumferentially and rigidly connected with a cylinder boss; threads are provided at an inner surface of the bushing and connected with external threads of the cylinder boss, so that the anti-rotation block is axially fixed by a screwing force; a circular ring boss is provided at an outer side of the bushing and matched with a circular ring clamping groove formed by a combination of the upper clamping block and the lower clamping block; the upper clamping block and the lower clamping block are mutually positioned through a positioning pin column hole and a positioning pin column and fastened by a hoop long bolt assembly to hoop the bushing but not limit a circumferential rotation of the bushing; and fastening bolt holes are provided at four corners of each of the damping block, and an interlocked combination of the upper clamping block and the lower clamping block, in such a manner that the damping block, the upper clamping block and the lower clamping block are fixed on the support plate by a fastening bolt assembly;

two ring bosses are adjacently provided at an outer side of a neck of the cylinder boss, the ring boss near a cylinder mouth is configured as an octagonal boss, the ring boss near a cylinder shoulder is configured as a circular boss, and a diameter of the circular boss is larger than a diameter of a circumscribed circle of the octagonal boss; the anti-rotation block is provided with an octagonal inner hole, and a size of the octagonal inner hole is equal to a size of the octagonal boss at the neck of the cylinder boss; an outer edge of the anti-rotation block is arranged as an octagonal outer edge, and each side is provided with a square protrusion for enhancing reliability of connecting the anti-rotation block and the damping block;

a shape of the groove of the damping block is the same size as a shape formed by combining the octagonal outer edge and the square protrusion of the anti-rotation block; a groove depth ($t_1$) of the groove, a thickness ($t_2$) of the anti-rotation block and a maximum axial deformation ($\Delta Lmax$) of the Type IV cylinder satisfy $t1-t2>2\times\Delta Lmax$; the anti-rotation block is arranged in the groove with gaps at both a front and a rear side of the anti-rotation block, and the width of the gap at the front and the width of the gap at the rear of the anti-rotation block are each greater than $\Delta Lmax$ to prevent the anti-rotation block from colliding with the damping block at the sliding end; a diameter of the through hole of the damping block is greater than a diameter of the circular boss at the neck of the cylinder boss; and the upper clamping block is provided with a semicircular first clamping groove, and the first clamping groove is provided with a surface polished smoothly; a left and a right truncation surface of the first clamping groove are both provided with a first hoop long bolt hole, and a positioning pin column hole is provided close to the first hoop long bolt holes; the lower clamping block is provided with a semicircular second clamping groove, and the second clamping groove is provided with a surface polished smoothly; a left and a right truncation surface of the second clamping groove are both provided with a second hoop long bolt hole, and a positioning pin column is provided close to the second hoop long bolt hole; a width of the first clamping groove of the upper clamping block is consistent with a width of the second clamping groove of the lower clamping block; a diameter of the positioning pin column hole is equal to a diameter of the positioning pin column; the circular ring clamping groove is formed inside the combination of the upper clamping block and the lower clamping block, and a diameter of the circular ring clamping groove is equal to a diameter of the circular ring boss of the bushing.

2. The flexible connection device of a Type IV cylinder and a container frame according to claim 1, wherein the circular ring boss is provided at an outer side of the bushing, and an entire outer surface of the bushing is polished smoothly.

3. The flexible connection device of a Type IV cylinder and a container frame according to claim 1 wherein at the fixed end, the widths of the first clamping groove of the upper clamping block and the second clamping groove of the lower clamping block are consistent with a width of the circular ring boss of the bushing; at the sliding end, the widths of the first clamping groove of the upper clamping block and the second clamping groove of the lower clamping block are greater than the width of the circular ring boss of the bushing, and a difference therebetween is greater than twice of the maximum axial deformation of the Type IV cylinder, so as to provide a space for an axial deformation of the Type IV cylinder.

4. The flexible connection device of a Type IV cylinder and a container frame according to claim 3, wherein at the sliding end, the circular ring boss of the bushing is arranged in the circular ring clamping groove formed by the combination of the upper clamping block and the lower clamping block, with gaps at both a front and a rear side of the circular ring boss, and the widths of the two gaps at the front and the rear, respectively, side of the circular ring boss are larger than $\Delta Lmax$; and adjusting gaskets are arranged in respective gaps at the front and the rear side of the circular ring boss.

5. The flexible connection device of a Type IV cylinder and a container frame according to claim 4, wherein each of the adjusting gaskets has a thickness less than $\Delta Lmax$ and is layered in a thickness direction, with bonding between layers, and the materials of the layers are different from each other in hardness, so as to be adapted to an axial deformation of the Type IV cylinder under different working conditions.

* * * * *